United States Patent
Ogawa et al.

(10) Patent No.: US 6,728,305 B2
(45) Date of Patent: Apr. 27, 2004

(54) SIMULTANEOUS PLURAL CODE SERIES GENERATOR AND CDMA RADIO RECEIVER USING SAME

(75) Inventors: Shinsuke Ogawa, Yokohama (JP); Hirofumi Takagi, Yokohama (JP); Akihiro Higashi, Yokosuka (JP)

(73) Assignee: NTT Mobile Communications Network, Inc. (JP)

( * ) Notice: Subject to any disclaimer, the term of this patent is extended or adjusted under 35 U.S.C. 154(b) by 4 days.

(21) Appl. No.: 10/175,802

(22) Filed: Jun. 21, 2002

(65) Prior Publication Data

US 2002/0181558 A1 Dec. 5, 2002

Related U.S. Application Data

(62) Division of application No. 09/254,676, filed on Mar. 16, 1999.

(30) Foreign Application Priority Data

Nov. 19, 1997 (JP) ................................. 9-317910
Dec. 15, 1997 (JP) ................................. 9-344797

(51) Int. Cl.⁷ .............................................. H04B 1/707
(52) U.S. Cl. ........................ 375/148; 375/347; 375/349
(58) Field of Search .................................. 375/142, 143, 375/144, 148, 150, 347, 349; 370/320, 335, 342

(56) References Cited

U.S. PATENT DOCUMENTS

| | | |
|---|---|---|
| 3,746,847 A | 7/1973 | Maritsas |
| 5,111,416 A | 5/1992 | Harada |
| 5,596,516 A | 1/1997 | Higashi et al. |
| 5,598,154 A | 1/1997 | Wilson et al. |
| 5,761,239 A * | 6/1998 | Gold et al. ............... 375/150 |

FOREIGN PATENT DOCUMENTS

| | | |
|---|---|---|
| CA | 2181637 | 7/1996 |
| JP | 59-47833 | 3/1984 |
| JP | 60-176322 | 9/1985 |
| JP | 60-177719 | 9/1985 |
| JP | 9-181704 | 7/1997 |

* cited by examiner

Primary Examiner—Stephen Chin
Assistant Examiner—Kevin Kim
(74) Attorney, Agent, or Firm—Connolly Bove Lodge & Hutz LLP

(57) ABSTRACT

A CDMA radio receiver includes a plurality of reception fingers for effecting a dispreading of a received signal with a plurality of spread codes to derive received data. The receiver includes a plural code generator for simultaneously generating and supplying spread codes to the plurality of reception fingers, and a controller for designating a plurality of spread codes which are to be generated and supplied to the plural code series generator and for specifying to which finger they are to be supplied. The plural code series generator includes a shift register having a plurality of shift stages in which a first initial value is loaded by the controller and adapted to be subject to a shift operation in synchronism with a clock.

20 Claims, 13 Drawing Sheets

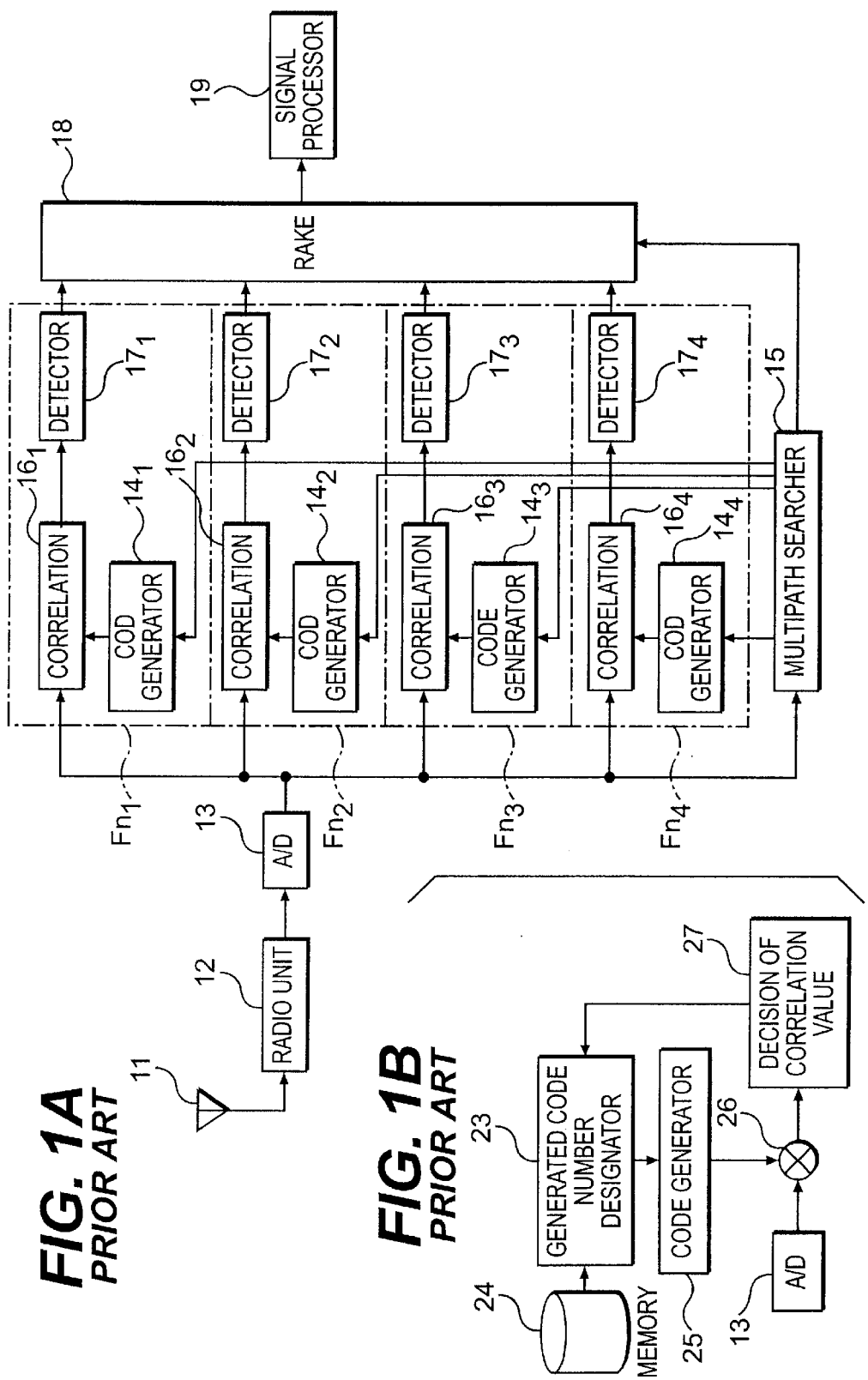

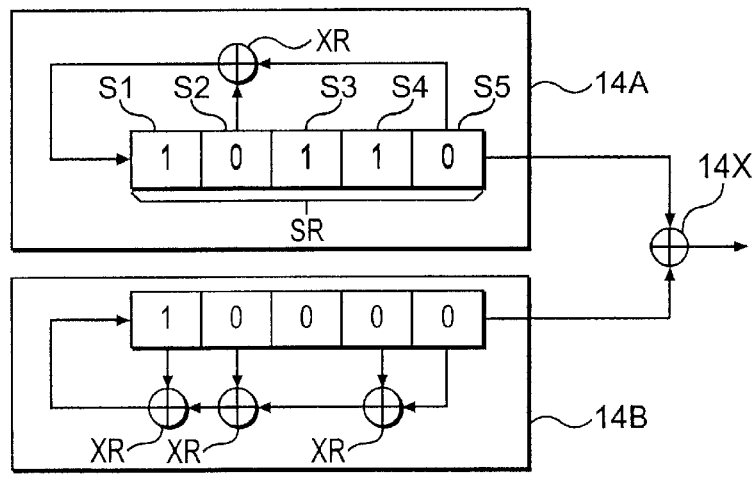
FIG. 2A
PRIOR ART
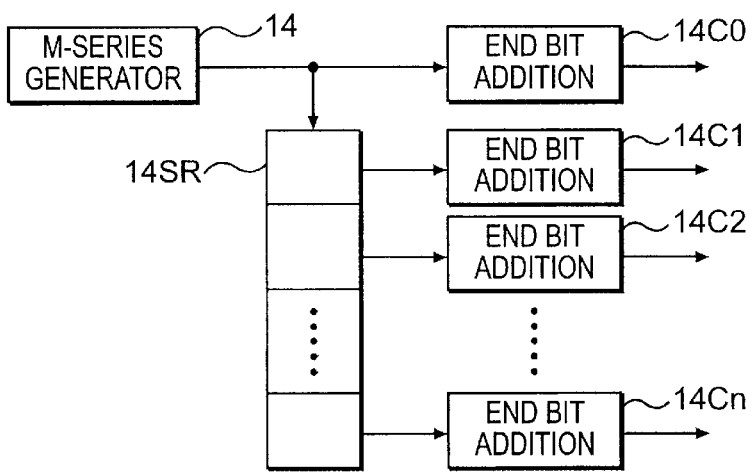
FIG. 2B
PRIOR ART
FIG. 2C
PRIOR ART
CODE 1
111111000110111010100001001011001
CODE 2
011111000110111010100001001011011
ONE BIT RIGHT-SHIFTED CODE 1
111111000110111010100001001011000

SIMULTANEOUS PLURAL CODE SERIES GENERATOR AND CDMA RADIO RECEIVER USING SAME

This application is a divisional of U.S. Ser. No. 09/254,676, filed Mar. 16, 1999.

TECHNICAL FIELD

The invention relates to a code generator which simultaneously generates a plurality of code series which are in mutually orthogonal relationship to each other, and also a CDMA radio receiver using same.

PRIOR ART

A code series generator of the kind described is used for various purposes in the field of communication. For example, in order to preserve secrecy of information being transmitted in a radio communication, digital data from the transmitting side is multiplied by a code series, referred to as a secret code, in a scrambler circuit while received data is multiplied by a secret code which is of the same type and of the same phase as the secret code used on the transmitting side in a descrambler circuit of the receiving side. In the CDMA radio communication, a code series, called a spread code, is used to provide a multiple access. On the transmitting side, data is multiplied by a spread code before transmission while on the receiving side, a received signal is multiplied by the spread code to derive data. Different codes are orthogonal to each other, and a communication is enabled by the use of the spread code of the same type and of the same phase on both the transmitting and the receiving side.

If a code series used on the transmitting side is unknown in the secret code communication or CDMA radio communication, it is necessary on the receiving side to retrieve the type of the code series used on the transmitting side. Because the number of the types of the code series used is fixed, a plurality of code series may be used in parallel during the retrieval to reduce a length of time required for the retrieval. Also, in the CDMA radio communication, if a single user simultaneously uses a plurality of code series (multicode), a high rate of transmission is enabled, thus allowing a variety of services to be offered.

FIG. 1A shows an example of an arrangement for a receiver of a mobile unit in a conventional CDMA radio communication. Describing a flow of a received signal in this arrangement, a signal received at an antenna 11 is demodulated in a radio unit 12 to be converted into a baseband signal, which is then converted into a digital signal in an A/D converter 13. Supplied to code generators $14_1$–$14_4$ are spread code information which is detected by a multipath searcher 15 as well as a frame timing. This allows the code generators $14_1$–$14_4$ to generate a code each which is synchronized with a spread code used on the transmitting side. A multiplication between the baseband signal from the A/D converter 13 and the spread codes from the code generators $14_1$–$14_4$ then takes place in correlators $16_1$–$16_4$ to effect a despreading, thus recovering an original signal. Subsequently, the reversely spread signals are detected in detectors $17_1$–$17_4$ and are then synthesized by a RAKE receiver 18 to be delivered to a signal processing unit 19. The despreading process which takes place in the correlators $16_1$–$16_4$ permits a separation of signals from different transmission paths (or multi-path) which are contained in the received signal, and thus this reception processing represents a RAKE reception with path diversity effect.

Gold code series, for example, which exhibit an excellent orthogonality between codes is used for the code series mentioned. Gold code series generator comprises a first M-series generator 14A, a second M-series generator 14B, and an exclusive OR 14X which calculates an exclusive OR of both outputs from the M-series generators 14A, 14B, as shown in FIG. 2A. It is to be understood that throughout subsequent Figures, the symbol including "+" mark in a circle indicates an exclusive OR. The first and the second M-series generator 14A, 14B generates mutually different M-series, that is, codes which are distinct from each other if they are compared against each other at any phase relationship.

M-series generator 14A comprises a shift register, SR and an exclusive OR XR, and a value in each shift stage is shifted by one stage toward a last stage S5 in response to each shift clock, whereby M-series is delivered as an output from the last stage S5 of the shift register SR. Simultaneously, the exclusive OR XR forms an exclusive OR of the output from the last stage and an output from an intermediate shift stage, with its output being fed back to an initial stage S1 of the shift register SR. In the second M-series generator 14B, each of a plurality of shift stages of its shift register is connected with an exclusive OR XR to form an exclusive OR with an output to be fed back to the initial stage. Thus, mutually different M-series are generated by changing the locations and/or the number of shift stages which are connected with the exclusive OR's. A register value in a single shift register which defines M-series changes for every clock, but retains a periodicity such that it returns to its original initial value after the register value has gone a round through all possible combinations. Denoting the number of shift stages of the shift register SR by n, the length of the period is equal to $2^n-1$ chips. By adding together (or forming an exclusive OR of) two such different M-series in the exclusive OR 14X, there is obtained Gold code series having the same period as the M-series.

Different Gold code series can be formed by changing an initial value loaded into a shift register which defines M-series. A user can use a plurality of different Gold code series simultaneously to achieve a reduction in the length of time required to identify Gold code series used on the transmitting side or a high rate data transmission.

It has been customary in the art of radio communication to use a separate code generator for each code series in order to generate a plurality of different code series simultaneously. Accordingly, as the number of code series generated increases, there results an increase in both circuit scale and power dissipation.

Japanese Laid-Open Patent Application No. 264,098/1995 discloses a spread spectrum communication system including a code generator for simultaneously generating a plurality of spread codes and which is constructed as shown in FIG. 2B. Specifically, an output from an M-series generator 14 is supplied to an end bit adding unit 14C0 and to a shift register 14SR, an output from each shift stage of which is supplied to an end bit adding unit 14C1–14Cn, respectively, the end bit adding units delivering a series of codes which are substantially orthogonal to each other. The M-series generator 14, the shift register 14SR and the end bit adding units 14C0–14Cn are operated by a same clock. In this manner, (n+1) spread codes are generated.

With the code generator shown in FIG. 2B, the circuit scale and the power dissipation are both reduced than when a code generator is used for each code series.

In the code generator shown in FIG. 2B, the mutual orthogonality is given as a result of adding one bit to the end of each input code series or to the end of a code series having a sequential phase offset by one bit (or to the end of each code period) in each of the end bit adding units 14C0–14Cn. However, a phase offset by one bit produces a significant cross-correlation between the codes. Assume that output codes delivered from the end bit adding units 14C0, 14C1 are code 1 and code 2 ("1" being added to the end of code 1 and code 2) as shown in FIG. 2C, for example. If one bit shift to the right is caused as by a transmission path delay to the code 1, there would be only two bit differences for the leading bit and the trailing bit between the code 1 which is shifted by one bit to the right and the code 2, producing a remarkable magnitude of cross-correlation between the codes, which can no longer be treated as distinct codes.

Thus, a plurality of codes generated by a code generator as shown in FIG. 2B involves a likelihood of causing an interchannel interference when they are used in a communication such as a mobile communication which is subject to a varying propagation delay.

As mentioned previously, the code series generated by the M-series generator has a length of period which is equal to $2^n-1$ chips. When code series are taken from each shift stage of the shift register SR of the M-series generator 14A, there are obtained code series which have different amounts of delay. The code series obtained in this manner are equal to n in number as may be derived from the respective stages of the shift register SR, even though there are $(2^n-1)$ delays for the code series inasmuch as the length of period is equal to $2^n-1$ chips. It is also to be noted that they are merely distinguished by a sequential phase offset by one chip. Arbitrary code series which are sufficiently spaced apart in phase may be chosen from $(2^n-1)$ code series, for example, by connecting $(2^n-1)$ bit shift register to the output of the M-series code generator 14A and taking code series from arbitrary shift stages of this shift register. However, $(2^n-1)$ bit shift register needs an increased circuit scale. Alternatively, code generators would have to be used which generate code series having desired delays between them. This again needs an increased circuit scale if the number of code series increases.

Accordingly, it is a first object of the invention to provide a simultaneous plural code series generator capable of providing a plurality of code series having desired delays between them with a reduced circuit scale.

It is a second object of the invention to provide a code generator which simultaneously generates a plurality of codes with a reduced circuit scale and with a reduced power dissipation while maintaining a reduced cross-correlation between the codes in the event of occurrence of a phase offset between the codes, thus maintaining the orthogonality.

It is a third object of the invention to provide a CDMA receiver incorporating the plural code series generator and capable of performing a cell search and/or multi-path search in a reduced interval of time.

According to a first aspect of the invention, at least one code series is generated which is delayed with respect to code series generated by code generating means, and an exclusive OR of the undelayed and the delayed code series is formed to provide code series which obtains a desired delay. A plurality of means for delivering code series having a desired delay through the exclusive OR are provided.

According to a second aspect of the invention, the simultaneous plural code series generator according to the first aspect is provided, and second code series generating means is also provided which generate code series which is substantially orthogonal to code series generated by code series generating means within the simultaneous plural code series generator, an exclusive OR between the code series from the second code series generating means and each of the plurality of code series from the simultaneous plural code series generator being formed to provide a plurality of code series simultaneously which are substantially orthogonal to each other.

According to a third aspect of the invention, a plurality of arbitrary spread codes are simultaneously generated by single means, and a multiplication is effected for an arbitrary combination of the spread codes and a received signal to derive a correlation value, which is used to perform a search for a visitor cell or a border cell.

The single spread code generating means generates a plurality of code series, each of which is imparted an equal delay, and an exclusive OR of these having the equal delay is formed, thereby simultaneously generating spread codes of different codes.

BRIEF DESCRIPTION OF THE DRAWINGS

FIG. 1A is a block diagram of a conventional CDMA radio receiver;

FIG. 1B is a view showing an arrangement of a multi-path searcher 15 shown in FIG. 1A;

FIG. 2A is a block diagram showing a conventional Gold code series generator;

FIG. 2B is a block diagram illustrating the prior art in which a single code generator simultaneously generates a plurality of code series;

FIG. 2C is a view of a code train illustrating a problem experienced with the arrangement of FIG. 2B;

BEST MODES OF CARRYING OUT THE INVENTION

Figure 3:
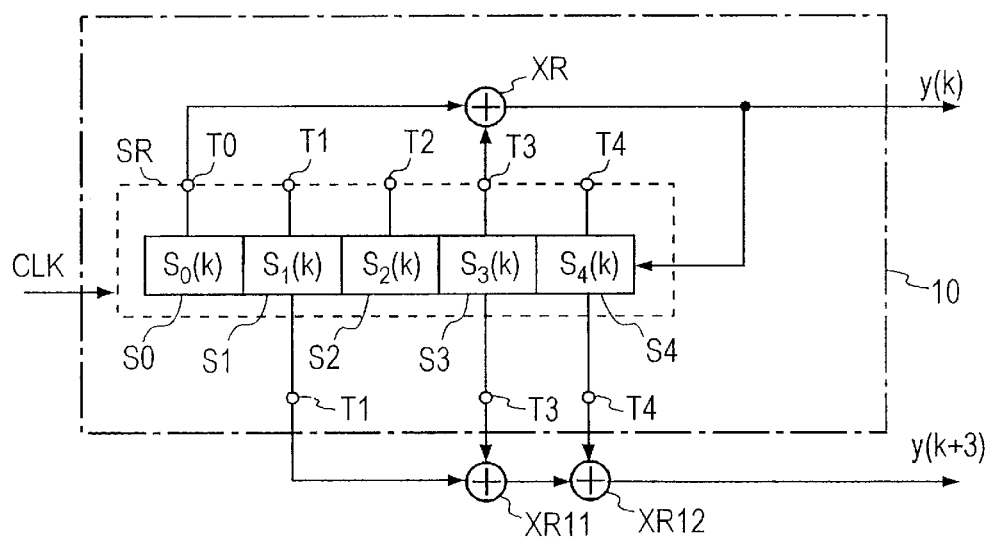
FIG. 3 is a diagram showing an M-series generator illustrating the principle of the invention.

Before describing the embodiments of the invention, the principle of the invention for generating a plurality of code series will be described initially. As illustrated in FIG. 3, a shift register SR has M delay stages S0–S4 (where M=5), and an exclusive OR XR which forms an exclusive OR of outputs from a plurality of desired delay stages in the shift register SR. An M-series generator 10 is arranged such that the output from the exclusive OR XR is fed back to an input stage S4 of the shift register SR. It is well known in the art that in such generator, M-series code y(k) having a $2^M-1$ chip length, for example, can be generated through a shift operation which occurs for a shift clock CLK. In the description to follow, the exclusive OR XR which delivers M-series fed back to the input stage of the shift register SR will be referred to as feedback exclusive OR. Values $S_0(k)$ –$S_4(k)$ held in the shift register SR (which will be hereafter referred to as register values) continue to vary during the shift operation which occurs for every clock CLK, but such register values are repeated at a period corresponding to $2^M-1$ clock periods.

As shown in FIG. 3, register values in the shift register SR after k(=0, 1, 2, . . . ) times of shift operation are denoted as follows:

$$S(k) = \begin{pmatrix} S_0(k) \\ S_1(k) \\ S_2(k) \\ S_3(k) \\ S_4(k) \end{pmatrix}$$

It is to be noted that the shift stages are termed as S0, S1, S2, S3 and S4 beginning from the last stage. Representing a bit delivered from the shift register SR after k times of shift operation by y(k), y(k) is obtained by forming an exclusive OR between outputs $S_0(k)$ and $S_3(k)$ at taps T0 and T3, respectively, hence we have $$y(k) = \qquad\qquad (1)$$

$$S_0(k) + S_3(k) = (1\ 0\ 0\ 1\ 0) \begin{pmatrix} S_0(k) \\ S_1(k) \\ S_2(k) \\ S_3(k) \\ S_4(k) \end{pmatrix} = (1\ 0\ 0\ 1\ 0) S(k)$$

Thus, y(k) can be represented by the inner product between a vector representing the tap of the shift register SR to which a feedback takes place and the register values which are obtained after k times of shift operation. On the other hand, the register values are entirely shifted to the left by one chip in response to one operational clock, with consequence that the shift stages S0, S1, S2, S3 and S4 contains as follows:

$S_0(k+1)=S_1(k)$
$S_1(k+1)=S_2(k)$
$S_2(k+1)=S_3(k)$
$S_3(k+1)=S_4(k)$
$S_4(k+1)=S_0(k)+S_3(k)$

Representing the initial value of the register value by S(0), the register value S(1) after one shift operation is expressed by the following equation:

$$S(1) = \begin{pmatrix} S_1(0) \\ S_2(0) \\ S_3(0) \\ S_4(0) \\ S_0(0)+S_3(0) \end{pmatrix} = \begin{pmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 1 & 0 \end{pmatrix} \begin{pmatrix} S_0(0) \\ S_1(0) \\ S_2(0) \\ S_3(0) \\ S_4(0) \end{pmatrix}$$

where $$A_a = \begin{pmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 1 & 0 \end{pmatrix}$$

When the described processing operation is repeated, we have $$\begin{aligned} S(2) &= A_a^2 S(0) \\ S(n) &= A_a^n S(0) \end{aligned} \qquad (2)$$

Thus, the register value S(n) which prevails after n shift operations is obtained by applying a matrix $A_a^n$ to the initial value. The bit y(n) which is delivered after n shift operations is determined from the equations (1) and (2) as follows:

$$y(n)=(1\,0\,0\,1\,0)A_a^n S(0)=T_{an}S(0) \qquad (3)$$

where $T_{an}$ is a one row and five column matrix (horizontal vector), defined as follows:

$$T_{an}=(1\,0\,0\,1\,0)A_a^n \qquad (4)$$

What is mentioned above is disclosed in the U.S. Pat. No. 5,596,516, for example.

The equation (3) defining the output y(n) after n shift operations means that it is equivalent to an exclusive OR of the tap output represented by $T_{an}$ with respect to the shift register in which the initial value S(0) is set up. Accordingly, when there is provided another exclusive OR (which will be referred to as a second exclusive OR) which forms an exclusive OR of all tap outputs from the shift register SR which correspond to the positions having the element "1" in the tap vector $T_{an}$, there will be an output y(0) obtained from the feedback exclusive OR and an output y(n) which prevails after n shift operations obtained from the second exclusive OR when the current value S(0) is set up in the shift register. For example, if $$S(0) = \begin{pmatrix} 0 \\ 0 \\ 0 \\ 0 \\ 0 \\ 1 \end{pmatrix}, n=3$$

are applied to the equation (3), we have $$A_a^3 = \begin{pmatrix} 0 & 0 & 0 & 1 & 0 \\ 0 & 0 & 0 & 0 & 1 \\ 0 & 0 & 0 & 1 & 0 \\ 0 & 1 & 0 & 0 & 1 \\ 1 & 0 & 1 & 1 & 0 \end{pmatrix} \quad (5)$$

$$T_{an} = (10010)A_a^3 = (01011)$$

Using the equation (4), taking out signals from taps T1, T3, T4 shown in FIG. 3 and forming an exclusive OR thereof by means of exclusive ORs XR11 and XR12, an output y(k+3) which prevails after three shift operations can be obtained from the current register values. When a tap vector which represents the tap positions of the shift stages which are connected to the feedback exclusive OR by T, it will be seen that an output y(n) which prevails after n shift operations is generated generally from the current register value by forming an exclusive OR of outputs from tap positions which are indicated by the following equation:

$$T_{an} = TA_a^n \quad (6)$$

Figure 4:
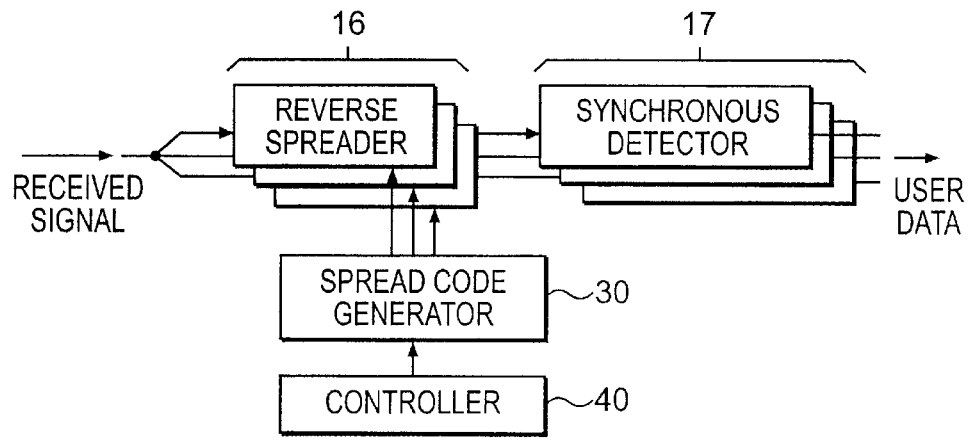
FIG. 4 is a block diagram showing an example in which the invention is applied to a despreading portion of CDMA radio unit of direct spreading type.

An embodiment in which the invention is applied to a despreading unit of the CDMA radio unit of direct spreading type will now be described. As shown in FIG. 4, in a despreading unit of a radio unit of the kind described, a plurality of types of spread codes are generated in a spread signal generator 30 according to the invention on the basis of information from a controller 40, and a received signal is reversely spread in a plurality of reverse spreaders 16 using corresponding ones of the plurality of spread codes. The signals which are reversely spread are synchronously detected in a plurality of synchronous detectors 17, respectively, to be delivered as user outputs.

Figure 5:
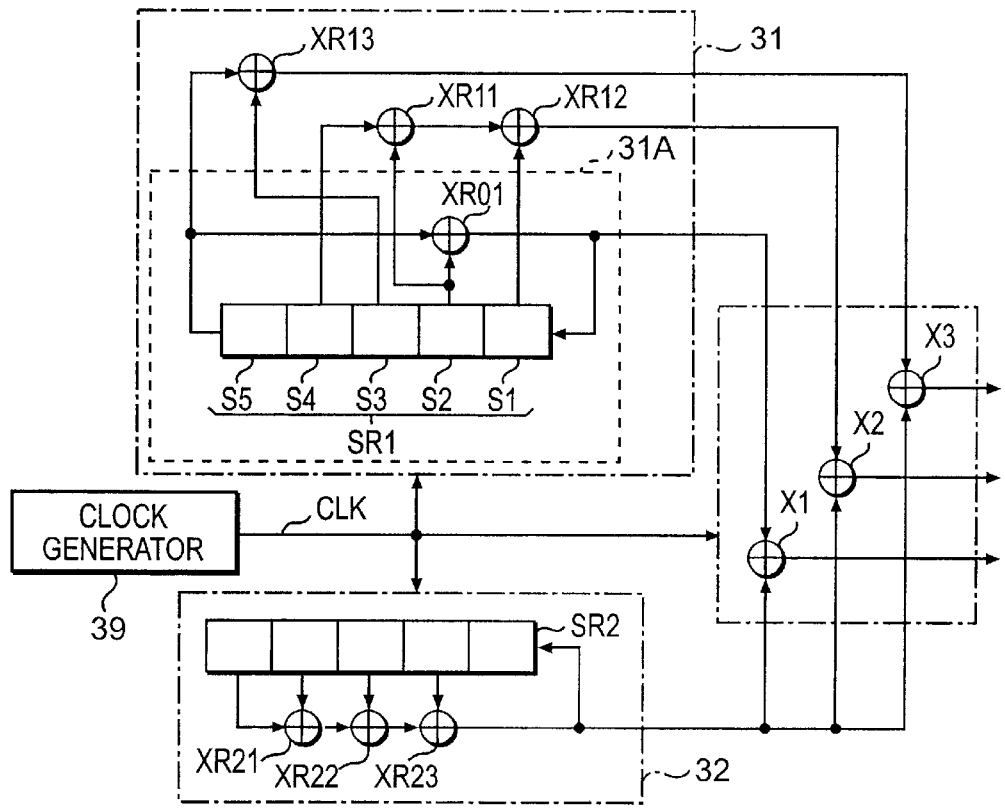
FIG. 5 is a block diagram showing an embodiment of a plural code series generator according to the invention.

FIG. 5 shows an embodiment of the invention, and parts corresponding to those shown in FIG. 2A are designated by like characters. In this embodiment, a shift register SR1 includes an initial stage S1, a second stage S2, a third stage S3, a fourth stage S4 and a fifth stage S5, from each of which an output is taken, thus deriving a plurality of M-series having amounts of delay which are different from each other. The plurality of M-series are combined to form exclusive OR's, thus obtaining an M-series having a desired delay. In the present example, an exclusive OR of M-series from the second and the fifth stage S2, S5 of the shift register SR1 is formed by an exclusive OR XR01, and is then fed back to the initial stage S1. A shift clock CLK from a clock generator 39 causes a shift operation of the shift register SR1 in synchronous manner, whereby first M-series is generated by the exclusive OR XR01. M-series from the second stage S2 and M-series from the fourth stage S4 are supplied to an exclusive OR XR11, an output of which is supplied to an exclusive OR XR12 together with the M-series from the initial stage S1, thus obtaining a second M-series which is given a desired delay at its output. Code series from the third stage S3 and codes series from the fifth stage S5 are supplied to an exclusive OR XR13, an output of which provide a third M-series which is given another given delay.

In a similar manner, outputs from shift stages S2, S3, S4 and S5 of a shift register SR2 are supplied to exclusive OR's XR21, XR22 and XR23, which form exclusive OR's, respectively, to provide a first M-series which is fed back to an initial stage S1. As a result of a shift operation of the shift register SR2 which occurs in synchronism with the clock CLK from the clock generator 39, the exclusive OR XR23 generates an M-series of a type which is different from the first M-series. In the description of remaining embodiments, the clock generator 39 will not be shown in the drawings unless it is required for purpose of description.

In this manner, an M-series having an arbitrary m-bit delay may be generated in accordance with the principle of the invention as mentioned above, by determining the position of shift stages, for which an exclusive OR is to formed in the manner described below.

Assuming that the second stage S2 and the fifth stage S5 of the shift register SR1 in an M-series generator 31A are connected to the inputs of the feedback exclusive OR XR01, the output of which is connected to the initial stages S1 of the shift register to define an M-series generator, as shown in FIG. 5, denoting a shift stage which is connected to the exclusive OR by "1" and a shift stage not connected by "0", the tap vector in this example will be equal to (10010). It will be seen that an M-series which is advanced by m chips relative to the M-series which is delivered from the feedback exclusive OR of the M-series generator 31A can be calculated by determining the following representation according the equation (4) where the sum refers to an exclusive OR:

$$(1\ 0\ 0\ 1\ 0)\begin{pmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 1 & 0 \end{pmatrix}^m$$

For example, for m=3, we have $$(1\ 0\ 0\ 1\ 0)\begin{pmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 1 & 0 \end{pmatrix}^3 = (1\ 0\ 0\ 1\ 0)$$

$$\begin{pmatrix} 0 & 0 & 0 & 1 & 0 \\ 0 & 0 & 0 & 0 & 1 \\ 1 & 0 & 0 & 1 & 0 \\ 0 & 1 & 0 & 0 & 1 \\ 1 & 0 & 1 & 1 & 0 \end{pmatrix} = (0\ 1\ 0\ 1\ 1)$$

When outputs from the shift stages S1, S2 and S4 which correspond to the elements "1" in the vector (01011), representing a result of a calculation, are connected to the exclusive ORs XR11 and XR12 as shown in FIG. 5, in the similar manner as shown in FIG. 3 to form an exclusive OR of M-series delivered from the shift registers S1, S2 and S4, there is obtained at the output of the exclusive OR XR12 the same value as the output y(3) from the feedback exclusive OR XR01 which prevails at the register value S(3) which is obtained three shift operations after the prevailing register value S(0) in the shift register SR1. In other words, there is obtained at the output of the exclusive OR XR12 an M-series which is always by three chips advanced relative to the output from the feedback exclusive OR XR01. Assuming a repetition period of $2^M-1$ chips for the M-series, it follows that an M-series which is advanced by three chips is the same as an M-series which is delayed by $(2^M-4)$ chips. Accordingly, an M-series derived by an exclusive OR of any other set of delay stages may sometimes be referred to as delayed M-series with respect to the M-series which is delivered from the feedback exclusive OR XR01.

Thus, with the embodiment of FIG. 5, a set of shift stages in the shift register SR1 may be determined so that an M-series of the same phase as the M-series which prevails after a given number (m) of shift operations can be generated, and an exclusive OR may be provided which forms an exclusive OR of the set of shift stages, thus generating an M-series which is advanced in phase by m bits. By providing a plurality of such sets of shift stages and also providing exclusive OR's for the respective sets, there can be obtained a plurality of M-series which have different phases. Specifically, in the example of FIG. 5, three M-series which have desired delays with respect to each other can be simultaneously obtained by the provision of the M-series generator 31A and three exclusive OR's XR11–XR13.

The example of FIG. 5 illustrates that the M-series generator 32 which generates an M-series distinct from the code generated by the M-series generator 31A is provided in addition to the simultaneous plural code series generator 31 according to the invention and in which the single M-series from the M-series generator 32 and three M-series from the plural code generator 31 are supplied to exclusive ORs X1, X2 and X3 to deliver three Gold code series which are substantially orthogonal to each other. In the M-series generator 32, an exclusive OR of outputs from a plurality of shift stages therein is formed by exclusive OR's XR21, XR22 and XR23 to be fed back to the initial stage S1 of the shift register SR2 and also to be delivered as an M-series. The M-series generator 32, the simultaneous plural code series generator 31, and the exclusive OR's X1, X2 and X3 operate in accordance with the common clock CLK from the clock generator 39. It is to be noted that when a "0" is fed in all the shift stages in the shift register SR2, the code generator 32 delivers a series comprising only "0's", and accordingly, the exclusive OR's X1, X2 and X3 merely deliver the three M-series generated by the code series generator 31.

Figure 6:
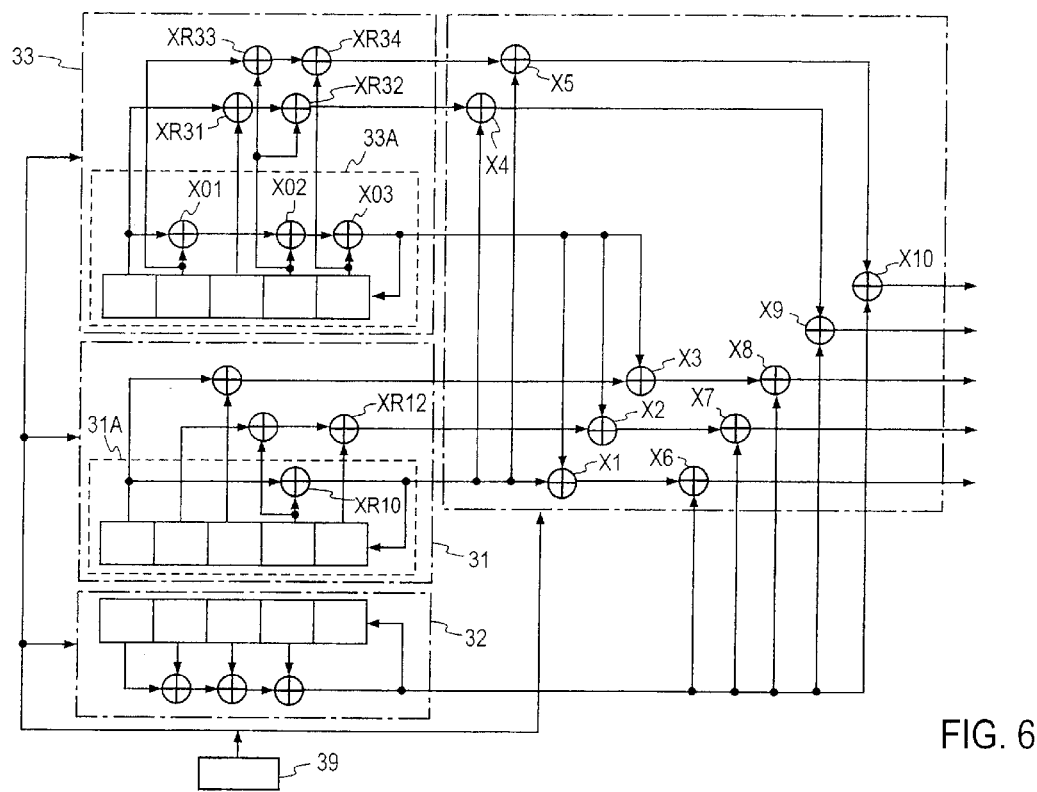
FIG. 6 is a block diagram showing another embodiment of a plural code series generator according to the invention.

FIG. 6 shows an embodiment in which M-series generated by a plurality of M-series generators are formed into a variety of combinations, an exclusive OR of each of which is formed to generate a number of different code series, and it is to be noted that parts corresponding to those shown in FIG. 5 are designated by like characters.

In this example, in addition to the code generator 32 and the simultaneous plural code series generator 31, another simultaneous plural code series generator 33 is provided, which comprises, in the example shown, an M-series generator 33A which is different from the M-series generators 31A and 32, and exclusive OR's XR31–XR34 which combine delayed code series taken from a plurality of shift stages in the M-series generator 33A to calculate exclusive OR's, thus, providing as a whole, three code series which have desired delays relative to each other.

Exclusive OR's of the code series delivered from the M-series generator 33A and the three code series from the simultaneous generator 31 are formed by calculators X1, X2 and X3, exclusive OR's of the code series delivered from the M-series generator 31A and respective code series delivered from the exclusive OR's XR32 and XR34 are formed by calculators X4 and X5, and exclusive OR's of the respective code series delivered from the calculators X1–X5 and the code series delivered from the M-series generator 32 are formed by calculators X6–X10, respectively, thus obtaining five code series which are substantially orthogonal to each other. However, in this instance, the delivered code series are not Gold series.

In the above embodiment, M-series generators have been used, but at least one or all of these M-series generators may be replaced by other code generators, provided that the code series generated by such code generators are substantially orthogonal to each other. A delay element internally housed is utilized for generating code series, thus deriving a plurality of delayed code series and exclusive OR's of combinations of these delayed code series are formed to generate a plurality of code series which have desired delays relative to each other. However, a shift register having a reduced number of shift stages may be externally connected to the code series generator and may be utilized in combination to provide desired delayed code series or in forming exclusive OR's which are used to obtain the latter.

The technique shown in FIG. 6 may be used with an increased number of simultaneous plural code series generators and code series generators, the outputs of which may be subject to the formation of exclusive OR's. While the above description is based on generating a plurality of Gold codes or M-series codes simultaneously, it is only necessary that the plurality of code series which are generated simultaneously be substantially orthogonal to each other.

Embodiment Applied to CDMA Receiver

In a conventional receiver used in the CDMA radio communication system, devoted means, referred to as a searcher, is used to effect a determination of a user visited cell upon turn-on of a power supply of a mobile unit, or during a standby condition thereof, for example, a search of a user visited border cell or multi-path search for user's reception. In a conventional arrangement, a reception finger $Fn_i (i=1, 2, 3, 4)$ including a code generator $14_i$, a correlator $16_i$; and a detector $17_i$ for performing a despreading/detection of a received signal and a multi-path searcher 15 which is independent from the reception finger and is devoted to a multi-path search of a reception channel are provided in the receiver of the mobile unit, as described above with reference to FIGS. 1A and 1B. A start-up operation upon turn-on of the power supply of the mobile unit in a conventional arrangement, namely, the operation from the determination of a user visited cell to the commencement of signal reception, will be described in summary below.

Upon turn-on of the power supply of the mobile unit, the mobile unit initially takes a baseband signal from the A/D converter 13 by means of the multi-path searcher 15 for searching for the cell visited by the mobile unit. The multi-path searcher 15 is arranged as shown in FIG. 1B. A generated code number designator 23 reads a spread code of a base station which can be a candidate, and designate the spread code to be generated to a code generator 25. The code generator 25 generates the designated spread code, which is multiplied in a multiplier 26 with the input signal from the A/D converter 13. On the basis of the result of multiplication, a correlation decision 27 calculates a correlation value between the input signal and the spread code generated by the code generator 25. A decision is rendered to see if the calculated correlation value is or is not higher than a given threshold value, identifying the spread code for the input signal and thus determining the visited cell. A spread code having a very long repetition period is normally used as the spread signal which is used for discrimination of the cell. Accordingly, it takes an increased length of time to determine the spread code for the user's cell by individually calculating a correlation with the input signal with all of long period spread signals (which may be simply referred to as a long code).

Thus, in order to enable a rapid cell search and to provide a more flexible receiver, it has been necessary to provide a plurality of spread code generators, resulting in a disadvantage that the circuit scale or power dissipation increases.

If the simultaneous plural code generator according to the invention which is mentioned above is used, there can be provided a CDMA receiver which is capable of an extensive cell search by simultaneously generating a plurality of different spread codes with a reduced circuit scale and power dissipation while avoiding a simultaneous use of a plurality of spread code generators.

Figure 7:
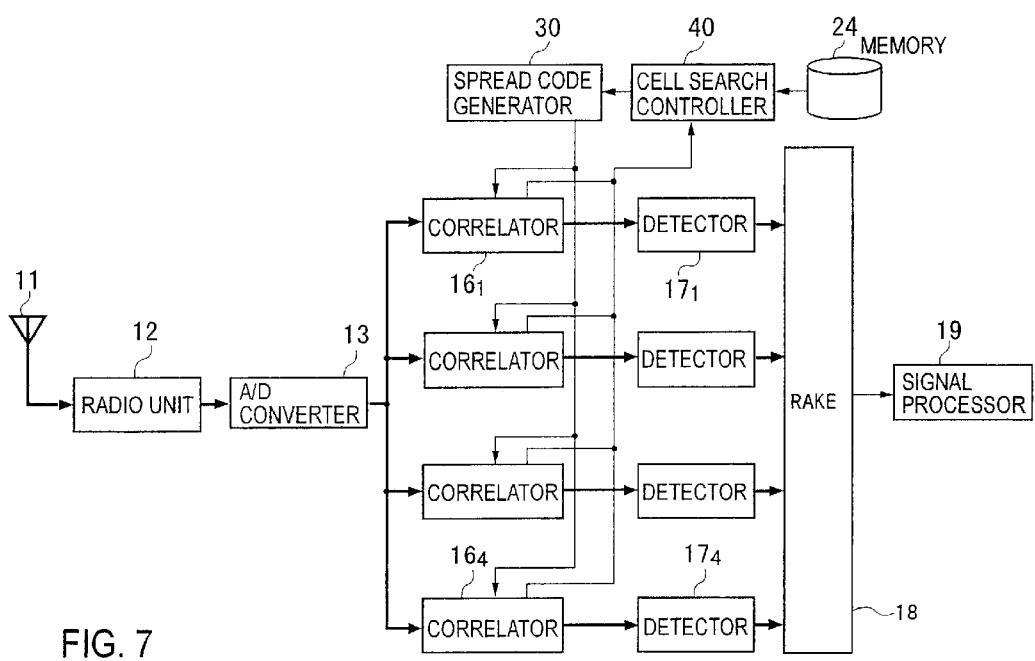
FIG. 7 is a block diagram showing an embodiment of CDMA receiver in which the plural code series generator according to the invention is used.

FIG. 7 is a an example of application of the invention to a receiver of CDMA mobile unit, and parts corresponding to those shown in FIG. 1A are designated by like characters. In this embodiment, there is provided a spread code generator 30 which simultaneously generates a plurality of spread codes and these different spread codes are supplied to correlators $16_1$–$16_4$ for correlation with a baseband input signal from the A/D converter 13. Also in this embodiment, correlation values determined by these correlators $16_1$–$16_4$ are supplied to a cell search controller 40, which performs a cell search control on the basis of the respective correlation values which are input.

Figure 8:
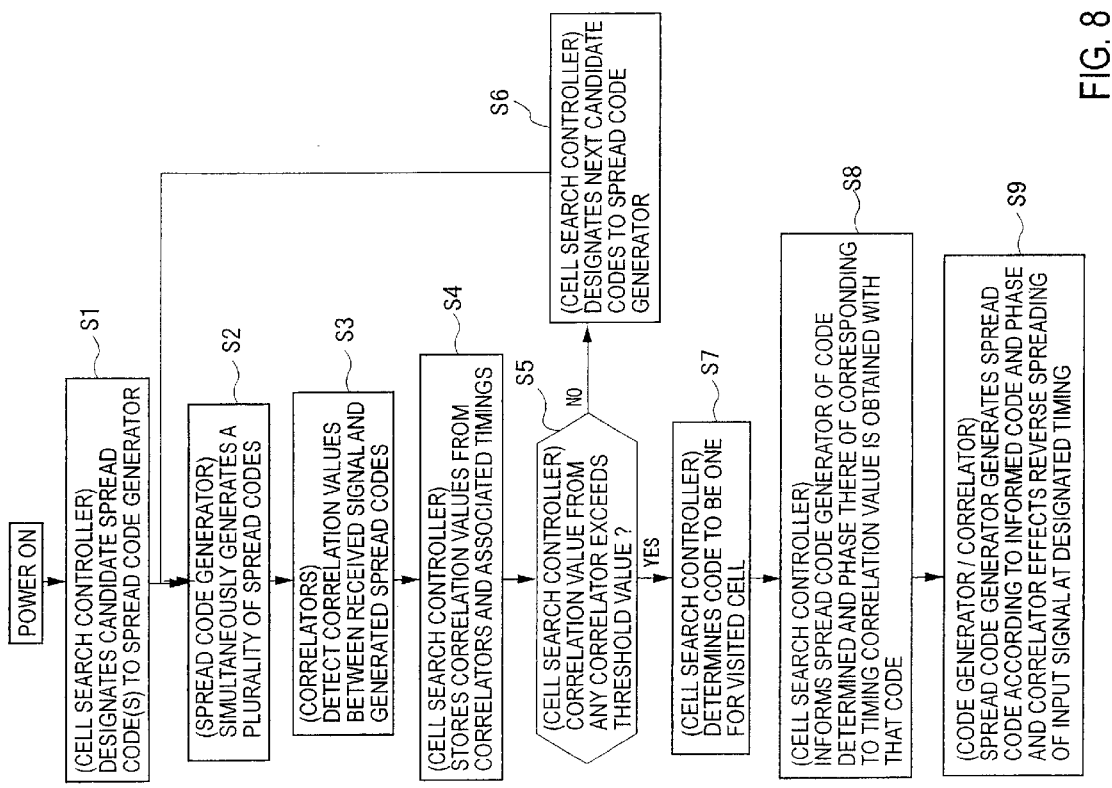
FIG. 8 is a flowchart illustrating a processing procedure for a visitor cell search in the embodiment of FIG. 7.

Referring to FIGS. 7 and 8, the start-up operation of the mobile unit thus constructed will be described in summary. Upon turn-on of the power supply of the mobile unit, a determination of user's visited cell is made initially. The cell search controller 40 reads a plurality of spread codes, which can be candidates and which are equal to the number of reception fingers, from a memory 24 and sets these candidates to the spread signal generator 30 (step S1). The spread code generator 30 simultaneously generates a plurality of spread codes which are set, and supplies them to respective correlators $16_1$–$16_4$ (step S2). In each correlator $16_1$–$16_4$, a correlation value with respect to the input signal is determined using the separate spread code from the spread code generator 30 (step S3). The cell search controller 40 stores the correlation values calculated in respective correlators $16_1$–$16_4$ and the timing when they are obtained (S4). The cell search controller 40 compares the calculated correlation value against a threshold value (S5), and in the absence of any spread code which exceeds the threshold value, designates new candidate spread codes to the correlators $16_1$–$16_4$ and then returns to step S2 (step S6), setting the candidates in the spread code generator 30 and simultaneously repeating the described operation until a spread code is found which exceeds the threshold value. When a spread code which exceeds the threshold value is detected, it is determined as the spread code for the visited cell (step S7), and informs the spread code for the visited cell which is thus determined to the spread code generator 30 (step S8). In addition, the cell search controller 40 determines a multipath reception signal for a plurality of timings when the correlation values are obtained using the spread signal which is thus determined, and detects the timing which corresponds to the highest correlation value to the spread code generator 30 (step S8). In response thereto, the spread code generator 30 simultaneously generates a plurality of spread signals with changing phases so that they may be used in the despreading at the plurality of timings and set them in correlators $16_1$–$16_4$. The cell search controller 40 designates a spread signal which is to be used in the multiplication with a received signal to the spread code generator 30 and the respective correlators $16_1$–$16_4$. In this manner, the respective reception fingers effect a despreading of the received baseband signal in accordance with the spread signal having the given phase, and then commences the reception of a signal from the cell which is determined as being visited by a user (step S9).

An operation during the speech communication will now be described in summary. During the communication, several ones of the reception fingers are used to effect the despreading of the received signal while the remaining fingers are used to effect the border cell search. For example, if the received signal level is sufficiently high, only one finger is used to effect a despreading of the received signal while all the remaining fingers are used to effect a border cell search, thus maximizing the number of spread codes which can be established at one time for the cell search and thus minimizing the search interval. Conversely, when the received signal level is very low, one finger is used for the border cell search while all the remaining fingers are used in effecting the despreading of the received signal to enable a RAKE reception of the resulting signal, thus achieving a maximum diversity effect.

Initially, the cell search controller 40 designates a spread code for a received signal and a phase aligned with its despreading timing and a spread code for the border cell search to the spread code generator 30, causing it to generate a spread code. For purpose of a despreading of the received signal, in the present instance, the spread codes generated by the spread code generator 30 are designated to all remaining reception fingers except one, for example. During the speech communication, on the basis of border cell information which is informed from the base station, a long code which is periodically set up is switched over with respect to the remaining one finger to conduct a search for border cells, thus determining the level. Information representing the level determined is used when a handover is required as a result of a quality degradation of the received signal. While the finger used for the border cell search is one in this description, a variable number of fingers may be used depending on the level of the received signal as mentioned previously, thus enhancing the efficiency of the border cell search.

An embodiment of generating a spread code by the spread code generator 30 of the described embodiment will now be shown. In this embodiment, Gold code series is used as the spread code. Different Gold code series may be generated by changing an initial value in a shift register which defines an M-series. The operation of the spread code generator 30 of this embodiment will now be described with reference to FIG. 9. In this embodiment, an arrangement is made so that arbitrary shift stages in shift registers SR1, SR2 of M-series generators 31, 32 may be used to take signals therefrom to be supplied to exclusive OR's.

The M-series generator 31 is constructed such that an exclusive OR of an output from a desired shift stage, which is S5, and an output from an intermediate shift stage, which is S2 in the shift register SR1, may be formed by an exclusive OR XR01, the output of which is delivered as a first M-series and is also fed back to a first shift stage S1, in the similar manner as shown in FIG. 1A. A second and a third M-series which have different phases from the first M-series are generated by forming exclusive OR's of outputs from a plurality of shift stages in the shift stages SR1. In the present example, an exclusive OR of outputs from the first shift stage S1 and the fourth shift stage S4 is formed by and exclusive OR XR12, thus delivering a second M-series which is advanced by one bit than the first M-series. An exclusive OR of outputs from the second shift stage S2, a third shift stage S3 and a fifth stage S5 is formed by exclusive OR's XR13 and XR14, thus delivering a third M-series. On the other hand, an exclusive OR of all outputs from the second, the third, the fourth and the fifth shift stages in the shift register SR2 is formed by exclusive OR's XR21, XR22 and XR23, the output of which is fed back to the input of the shift register SR2 and is also delivered as one M-series, in the similar manner as shown in FIG. 1A.

Figure 9:
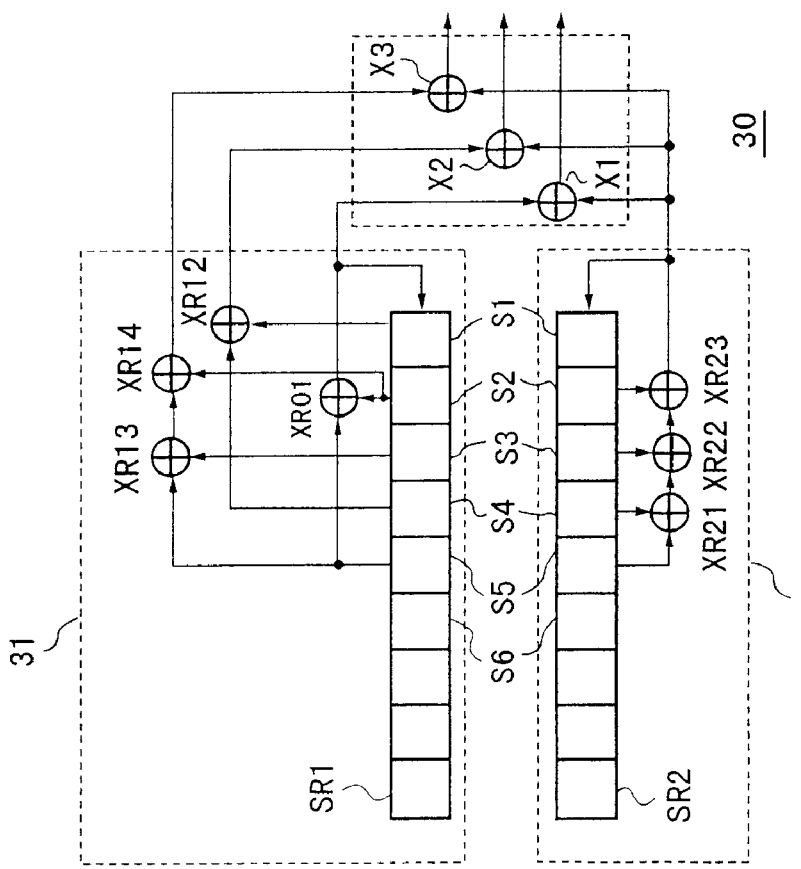
FIG. 9 is a diagram showing an example of spread code generator 30 shown in FIG. 7.

When the M-series generator 31 of FIG. 9 generates three M-series of different phases, and when their exclusive OR's with the M-series from the M-series generator 32 are formed, there are obtained three Gold codes which are substantially orthogonal to each other. To obtain an M-series of a phase which is different from the phase of the M-series which is determined by the set of shift stages selected to be fed to the feedback exclusive OR XR01, a combination of shift stages connected to exclusive OR's XR12, XR13 and XR14 may be determined in accordance with the principle of the invention mentioned above, thereby allowing an M-series of a desired phase to be generated. For example, the M-series generator 31 of FIG. 9 has five shift stages, and accordingly, there exist a number of combinations of shift stages which establish a phase, which is equal to $2^5-1=31$. Thus, it is possible to generate 31 types of Gold codes. While an instance of changing the set of shift stages in the M-series generator 31, an exclusive OR of which is to be formed in order to obtain an M-series of a desired phase has been described above, it is also possible to change the Gold code by selecting a set of shift stages in the M-series generator 32 which are connected to exclusive OR's XR21, XR22 and XR23 to change the phase of the M-series generated by the M-series generator 32. In addition, by changing the phase of the M-series in both M-series generators 31 and 32, the phase of Gold series code may be changed at will.

M-series having different phases relative to each other which are fed from exclusive OR's XR01, XR12 and XR14 are fed to exclusive OR's X1, X2 and X3 where exclusive OR's thereof with a different M-series from the exclusive OR XR23 are formed. M-series are generated from the outputs of exclusive OR's XR12 and XR14 which contain one and two idle bits as compared with the M-series from the exclusive OR XR01, and thus three different types of Gold codes are simultaneously output from the exclusive OR's X1, X2 and X3.

Figures 10, 11:
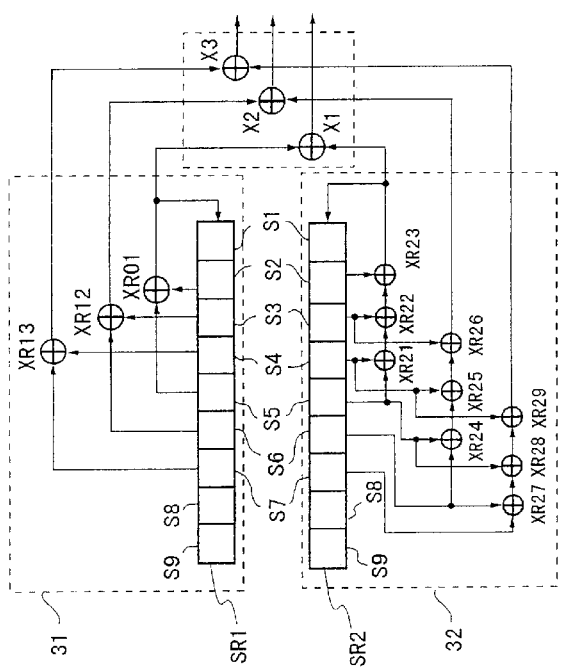
FIG. 10 is a chart showing an example of the content of a memory which stores a correspondence between an initial value for generating a code and the number of a spread code.
FIG. 11 is a diagram showing an example in which the spread code generator shown in FIG. 9 is modified into an arrangement in which a plurality of codes having different phases are generated with respect to a single spread code from the generator of FIG. 9.

To give an example, during the cell search which occurs upon the turn-on of the power supply of the mobile unit, an initial value for generating a code is established in the shift register SR1 of the M-series generator 31 of the spread code generator 30 while a predetermined initial value is established in the shift register SR2 of the M-series generator 32. The mobile unit includes a memory in which a correspondence between initial values for generating codes and the numbers of spread codes which are three Gold codes generated in a manner corresponding to the initial values (or numbers corresponding to the spread codes which are subject to a despreading) is stored, as shown in FIG. 10. Accordingly, when an initial value for generating a code is established in a shift register, a spread code is generated in accordance therewith. If it happens that a correlation value with the received baseband signal of the spread code which is generated from the established initial value fails to include a peak which exceeds a threshold value as mentioned above, a next initial value for generating a code is established in the shift register, thus generating three further different codes (Gold codes). A similar operation also applies if the initial value in the shift register SRI is maintained constant while the initial value in the shift register SR2 is changed.

As mentioned above in connection with the principle of the invention, changing an initial value which is established in the shift register of an M-series generator means changing the phase of an M-series generated. As mentioned briefly in connection with FIG. 9, by simultaneously changing initial values established in the shift registers SR1, SR2 of the two M-series generators 31, 32, the phases of the three Gold codes generated may be simultaneously changed.

FIG. 11 shows an exemplary arrangement of a spread code generator 30 which generates three same Gold codes having different phases. In this arrangement, while maintaining a relative positional relationship between two shift stages connected to the inputs of a feedback exclusive OR XR01, which are S2 and S5, two shift stages S3, S6 which are by one stage offset rearwardly are connected to an exclusive OR XR12, and shift stages S4, S7 which are by one further stage offset rearwardly are connected to an exclusive OR XR13. Accordingly, the exclusive OR's XR01, XR12 and XR13 which are connected to three sets of similarly offset shift stages deliver the same M-series which are sequentially delayed by one chip.

On the other hand, in an M-series generator 32, an exclusive OR of outputs from four shift stages S2–S5 are formed by exclusive OR's XR21, XR22 and XR23 while being fed back to the input stage of the shift register SR2 in the similar manner as in FIG. 9, but in addition, there are provided three exclusive OR's XR24, XR25 and XR26 which form exclusive OR's of outputs from shift stages S3–S6 which are by one stage offset rearwardly while maintaining the relative positional relationship between the first mentioned four shift stages, and three exclusive OR's XR27, XR28 and XR29 which form exclusive OR's of outputs from shift stages S4–S7 which are by further one stage offset rearwardly. Accordingly, the exclusive OR's XR26 and XR29 deliver the same M-series as the M-series delivered from the exclusive OR XR23, but which are sequentially delayed by one chip in phase relative thereto.

The three M-series from the M-series generator 31 which are sequentially offset by one chip are exclusively ORed with corresponding ones of the three M-series from the M-series generator 32 which are sequentially offset by one chip in exclusive OR's X1, X2 and X3, respectively. As a consequence, the exclusive OR's X1, X2, X3 deliver the same Gold codes which are sequentially by one chip delayed in phase.

It is also possible to change the generated Gold codes having different phases in the arrangement of FIG. 11 by changing the initial values established in one of the shift registers of the M-series generators 31, 32. The phases of the generated three Gold codes may be simultaneously changed by changing the initial values established in the both shift registers SR1, SR2.

When the plurality of Gold codes generated by the spread code generator 30 constructed as shown in FIG. 11 and which are sequentially offset in phase by one chip are used as spread codes during a multi-path search of the mobile unit, a despreading at a plurality of phases is enabled at one time to permit the detection of phases synchronized with the respective multiple paths (timings where a correlation is at maximum) in a reduced length of time. In this instance, sets of shift stages in the shift registers SR1, SR2 which are connected to the associated exclusive OR's may be offset relative to each other so that phase differences corresponding to correlation value peak intervals obtained at step S8 in FIG. 8 during the cell search be given between individual spread codes from the exclusive OR's X1, X2 and X3.

Figure 12:
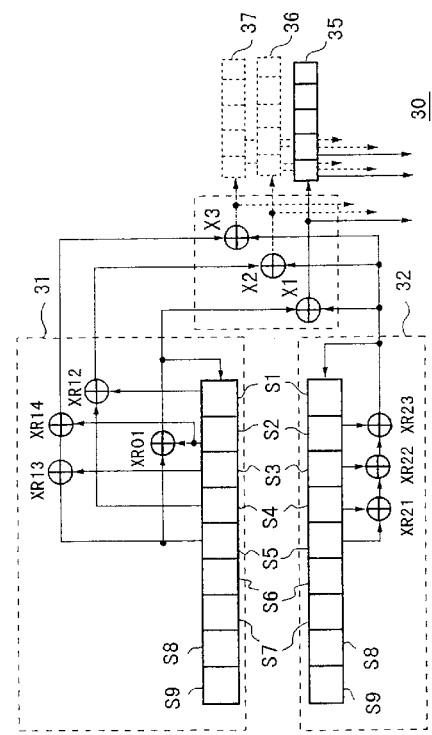
FIG. 12 is a diagram showing another example of a spread code generator which generates a plurality of spread codes having different phases for a same code.

FIG. 12 shows another exemplary arrangement for a spread code generator 30 which generates a plurality of same Gold codes having different phases as spread codes. In this example, rather than providing a plurality of exclusive OR's for shift stages in a pair of shift registers SR1, SR2 which are similarly offset relative to each other as in the arrangement of FIG. 11, a shift register 35 is connected to the output of the exclusive OR X1 in the arrangement of FIG. 9, and shift stages in the shift register 35 from which outputs are taken are selected, thereby generating a plurality of spread codes (which are Gold codes in the present instance) having a desired relative phases. As shown in broken lines in FIG. 12, shift registers 36, 37 may be similarly connected to the outputs of exclusive OR's X2, X3, also delivering other Gold codes of desired phases from desired shift stages.

Figure 13:
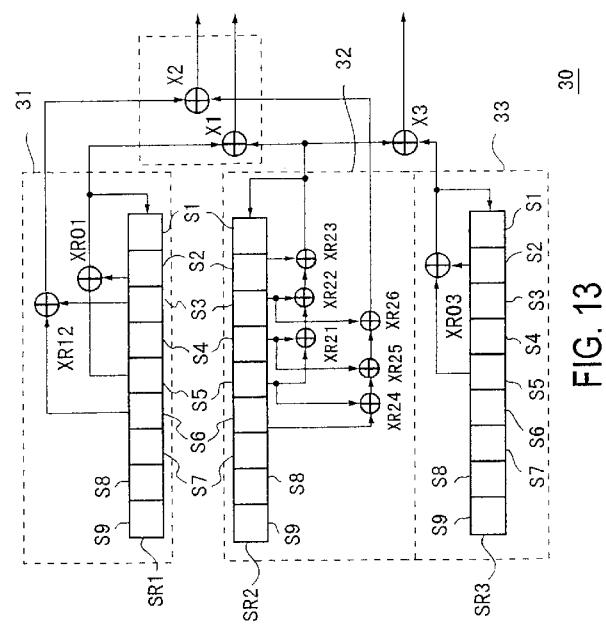
FIG. 13 is a diagram showing an example of an arrangement for a spread signal generator 30 which generates a plurality of spread codes for a same code and having different phases and which simultaneously generates spread codes for a different code.

FIG. 13 shows an example of a spread code generator 30 which generates a plurality of different types of Gold codes and in which a plurality of Gold codes of differing phases are generated for at least one type thereof. In this example, three M-series generators 31, 32 and 33 are provided. Of these, two, 31, 32, are constructed in the similar manner as shown in FIG. 11 where the positions of shift stages in the shift registers SR1, SR2 which are connected to the exclusive OR's are offset in a similar manner, thus generating two same Gold codes of differing phases by exclusive OR's X1, X2. A third M-series generator 33 includes a shift register SR3, two different shift stages S2, S5 of which are connected to a feedback exclusive OR XR03 to feed back the resulting exclusive OR to the input stage of the shift register SR3, and also to deliver it as an M-series. The M-series generated by the M-series generators 32, 33 are exclusively ORed in an exclusive OR X3, thus generating a Gold series. However, in an exemplary arrangement of FIG. 13, the shift stage position in the shift register SR1 connected to the feedback exclusive OR XR01 is located at the same location as the shift stage position in the shift register SR3 connected to the feedback exclusive OR XR03, and accordingly, it is necessary to establish mutually different initial values in the shift registers SR1 and SR3 in order to deliver different Gold codes from the exclusive OR's X1 and X3.

While three spread codes are generated in the described embodiment, it is also possible to employ a similar technique to generate four codes which are applicable to the receiver of FIG. 7. For example, a conversion from the status of FIG. 9 to a status of FIG. 11 can be achieved by a combination of a shift register and a DSP (digital signal processor), thereby allowing a combination of shift stages, an exclusive OR of which is to be formed, to be simply modified by way of software. In addition, the plurality of code series generating means may utilize M-series or may comprise other code series generating means.

In the foregoing description of FIG. 11, to generate an M-series which is delayed by a desired number of chips with respect to an M-series delivered from the feedback exclusive OR XR01, or to generate M-series which are delayed by one chip and by two chips, receptively, sets of shift stages S3, S6 and S4, S7 which are by one stage and by two stage, respectively, offset rearwardly, with respect to the set of shift stages S2, S5 which are connected to the feedback exclusive OR XR01, are connected to exclusive OR's XR12, XR13. Concomitantly, the connection in the shift register SR2 is such that sets of shift stages S3, S4, S5 and S4, S5, S6 are by one stage and by two stage, respectively, offset with respect to the set of shift stages S2, S3, S4 so that M-series are generated which are by one chip and by two chips, respectively, delayed with respect to the M-series delivered from the feedback exclusive OR XR23, an exclusive OR being formed for each set.

In this manner, in order to obtain an M-series having a desired delay, a shift register is expanded beyond the minimum number of the shift stages (basic number of shift stages) required to generate an M-series, which is five stages in the present example, so as to have additional number of shift stages rearwardly of the five stages. Even without such an expansion of the number of shift stages, the calculation according to the equation (6) given above allows the positions of shift stages for which an exclusive OR is to be formed to generate an M-series having an arbitrary delay (or an advance) in the M-series generator (such as shown in FIG. 3, for example) comprising the basic number of shift stages for generating an M-series to be determined.

Figure 14:
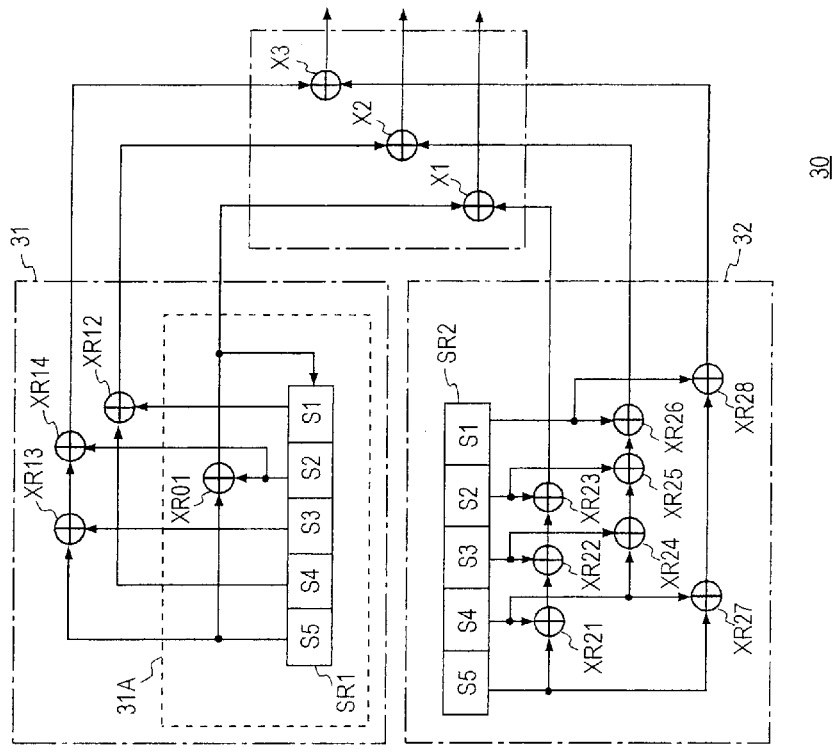
FIG. 14 is a diagram showing another example of an arrangement which generates a plurality of spread codes for a same code and having different phases.

FIG. 14 shows another embodiment for generating Gold codes having different phases in a similar manner as in FIG. 11, and in this embodiment, a pair of M-series generators 31, 32 use shift registers SR1, SR2 each having a utilizable number of shift stages which is equal to the basic number of the shift stages. The M-series generator 31 is arranged in the same manner as shown in FIG. 9, and sets of positions of shift stages which provide M-series that are by one chip and two chips, respectively, advanced with respect to an M-series delivered from a feedback exclusive OR XR01 are determined by the calculation according to the equation (6), thereby forming an exclusive OR of the set of shift stages S1, S4 and an exclusive OR of the set of shift stages S2, S3, S5 as shown. Also in the M-series generator 32, sets of shift stages S1, S2, S3, S4 and S1, S4, S5 are determined by the calculation so that M-series which are by one chip and by two chips, respectively, advanced with respect to the M-series delivered from a feedback exclusive OR XR23 can be generated. An exclusive OR of outputs from the former set is formed by exclusive OR's XR24, XR25, XR26, and an exclusive OR of outputs from the latter set of shift stages is formed by exclusive OR's XR27, XR28. These three M-series from the M-series generator 32 are exclusively ORed in exclusive OR's X1, X2, X3 with those of the three M-series from the M-series generator 31 which have corresponding delays, thus delivering three Gold codes having differing phases.

Figure 15:
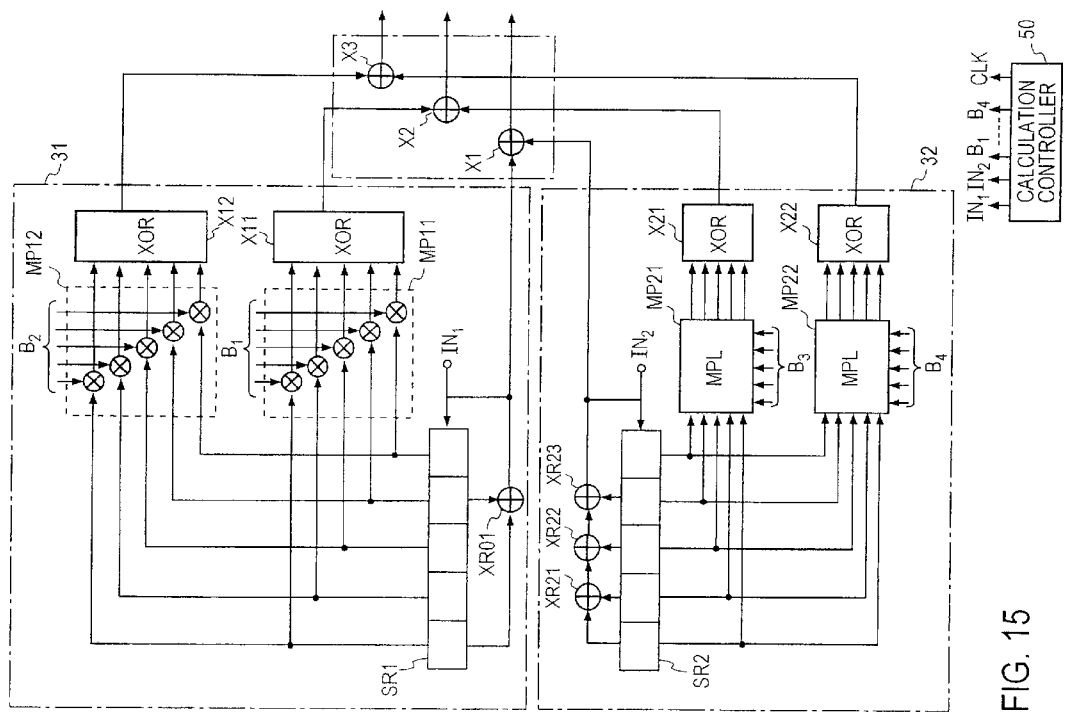
FIG. 15 is a diagram showing an example of an arrangement for a plural code generator which allows the delay in M-series to be arbitrarily modified.

In the description of FIG. 14, it has been stated that a set of shift stages which allow an M-series to be generated having a desired delay with respect to an M-series delivered from a feedback exclusive OR can be determined by a calculation, and accordingly, a set of shift stages which allow the generation of an M-series having an arbitrary delay can be selectively established. FIG. 15 shows a specific example which enables an arbitrary delay to be given. This embodiment represents an example in which the types of M-series generated are fixed. In a similar manner as in FIG. 14, an exclusive OR of a plurality of shift stages S2, S5 of a shift register SR1 which constitutes an M-series generator 31 is formed by a feedback exclusive OR XR01, which delivers it as one M-series while feeding it back to the initial stage of the shift register SR1.

In order to generate two further M-series, the M-series generator 31 in this embodiment also comprises multiplier circuits MP11, MP12 and exclusive OR's X11, X12 which form exclusive OR's of results of multiplication. Each of the multiplier circuits MP11, MP12 is fed with tap outputs from all the shift stages of the shift register SR1. The multiplier circuit MP11, MP12 are also fed with shift stage selection signals B1, B2 each having a number of bits which are equal to the number of total shift stages in the shift register SR1, thus allowing a multiplication of corresponding bits. Thus, an output from a shift stage which corresponds to "1" bit in the shift stage selection signal B1 is directly fed to the exclusive OR X11, while an output from a shift stage corresponding to "0" bit results in a result of multiplication equal to "0" being fed to the exclusive OR X11. Accordingly, a set of shift stages may be determined, an exclusive OR of which is used to generate an M-series, and a corresponding bit in the shift stage selection signal may be set to "1". An amount of delay which is given to a second code series to be generated as referenced to a first code series (output from the feedback exclusive OR XR01) may be determined, and then a calculation controller 50 can determine sets of shift stages to be selected by a calculation according to the equation (6). The same applies to the multiplier circuit MP12 and the exclusive OR X12.

An M-series generator 32 similarly comprises a pair of multiplier circuits MP21, MP22, and a pair of exclusive OR's X21, X22, and generates two code series which are given desired delays with respect to the code series generated by a feedback exclusive OR XR23.

With the arrangement of FIG. 15, it is possible to form an exclusive OR of a set of arbitrary shift stages in accordance with the shift stage select signal applied to the multiplier circuit, thus permitting an M-series which is given an arbitrary delay to be generated. The calculation controller 50 loads initial values IN1, IN2 into the shift registers SR1, SR2 and feeds a shift clock CLK to allow a shift operation of the shift registers, thus generating three M-series having differing phases from the respective M-series generators 31, 32. The three M-series from the M-series generator 31 and the three M-series from the M-series generator 32 which have corresponding delays are exclusively ORed in exclusive OR's X1, X2, X3, thus delivering three Gold codes of differing phases as spread codes.

Figure 16:
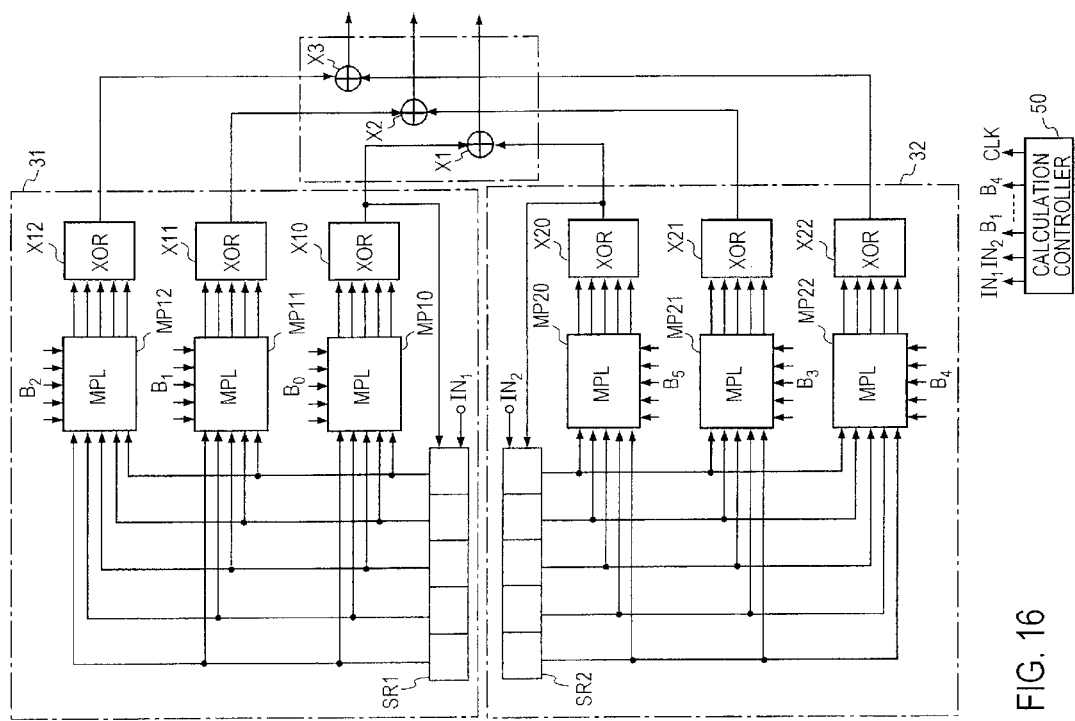
FIG. 16 is a diagram showing an example of an arrangement for a spread code generator which allows the type of and the delay in M-series to be arbitrarily modified.

FIG. 15 shows an instance in which the type of M-series generated by the M-series generators 31 and 32 is fixed. However, a multiplier circuit may be used to select a set of arbitrary shift stages which are subject to a feedback exclusive OR, thus forming an exclusive OR. Such an example is shown in FIG. 16. In this example, in place of the fixed connection of the exclusive OR of XR01 shown in FIG. 15 for the M-series generator 31, a multiplier circuit MP10 which performs a multiplication of all the taps of the shift register SR1 and a shift stage selection signal B0, and an exclusive OR X10 which forms an exclusive OR of a result of multiplication for all the shift stages are additionally provided. A code series from the exclusive OR X10 is fed back to the initial stage of the shift register SR1. An M-series generator 32 is similarly constructed, additionally including a multiplier circuit MP20 and an exclusive OR X20. The multiplier circuit M20 performs a multiplication between a shift stage selection signal B5 which is supplied from the calculation controller 50 and outputs from all the shift stages of a shift register SR2 to select specified shift stages for feeding the exclusive OR X20, with its exclusive OR output being fed back to the initial stage of the shift register SR2.

With the arrangement of FIG. 16, by changing the shift stage selection signals which are supplied to the multiplier circuits MP10, MP20 in the M-series generators 31, 32, the type of M-series which are generated can be changed. Obviously, by changing shift stage selection signal B1, B2, B3, B4 which are supplied to the multiplier circuit MP11, MP12, MP21, MP22, the delays imparted to the M-series generated can be changed in the similar manner as in FIG. 15.

FIG. 16 shows an arrangement in which the two M-series generators 31, 32 are arranged to be capable of changing the type of M-series. However, for an arrangement which generates a feedback M-series in the M-series generator 31, for example, a fixed connection of a set of predetermined shift stages to the feedback exclusive OR XR01 may be used in the similar manner as in FIG. 15. Conversely, the type of M-series generated in the M-series generator 32 may be fixed. An arrangement for forming an exclusive OR of a set of arbitrary shift stages by utilizing a combination of multiplier circuits and exclusive OR's as shown in FIGS. 15 and 16 is applicable to any arrangement illustrated in FIGS. 3, 5, 6, 9 and 11.

Effects of the Invention

As described, with the plural code series generator according to the invention, a code series generator and an exclusive OR or OR's may be used to generate a plurality of code series having desired delays simultaneously. In this manner, as compared with an arrangement in which $2^n-1$ bit shift register is provided or a separate code generator is used for each series, the circuit scale can be reduced and the power dissipation can also be reduced.

A plurality of code series which are substantially orthogonal to each other can be simultaneously generated while avoiding the use of a code generator for each code series and with a compact arrangement while also reducing the power dissipation, allowing respective code series to be separated in a positive manner if a plurality of propagation delays occur as experienced in a portable telephone.

When the plural code series generator according to the invention is applied to a CDMA receiver, a plurality of code series can be simultaneously generated with a simple means and without the use of a plurality of spread code generators, thus enabling a visited cell search and a border cell search to be accelerated in a receiver while reducing the circuit scale and the power dissipation.

What is claimed is:

1. A CDMA radio receiver including a plurality of reception fingers for effecting a despreading of a received signal with a plurality of spread codes to derive received data, comprising a plural code generator for simultaneously generating and supplying spread codes to the plurality of reception fingers, and a controller for designating a plurality of spread codes which are to be generated and supplied to the plural code series generator and for specifying to which finger they are to be supplied;

the plural code series generator comprising a shift register including a plurality of shift stages in which a first initial value is loaded by the controller and adapted to be subject to a shift operation in synchronism with a clock, a first code generating exclusive OR means for forming an exclusive OR of outputs from a predetermined first set of shift stages in the shift register, for delivering it as a first code series and for feeding the first code series back to the input of the shift register, and a plurality of code generating exclusive OR means, each forming an exclusive OR of outputs from each of a plurality of second sets of shift stages which are distinct from the first set and which are distinct from each other, delivering the exclusive OR's formed as a plurality of second code series which are delayed by given numbers of chips with respect to the first code series, the first code series and the plurality of second code series being supplied as spread codes to the plurality of reception fingers in accordance with the designation by the controller.

2. A CDMA radio receiver according to claim 1 in which the plural code generator further comprises a second shift register including a plurality of shift stages in which a second initial value which is distinct from the first initial value is loaded and adapted to be subject to a shift operation in synchronism with the clock;

a third code generating exclusive OR means for forming an exclusive OR of outputs from a predetermined third set of plural shift stages in the second shift register, for delivering it as third code series and feeding the third code series back to the input of the second shift register;

and a plurality of output exclusive OR means for forming exclusive OR's of the first and each of the second code series and the third code series and for delivering the exclusive OR's as spread codes which are substantially orthogonal to each other.

3. A CDMA radio receiver according to claim 1 in which the plural code series generator further comprises a second shift register including a plurality of shift stages in which a second initial value which is distinct from the first initial value is loaded and is adapted to be subject to a shift operation in synchronism with the clock;

a third code generating exclusive OR means for forming an exclusive OR of outputs from a predetermined third set of plural shift stages in the second shift register, for delivering it as a third code series and for feeding the third code series back to the input of the second shift register;

a third shift register including a plurality of shift stages in which a third initial value which is distinct from the first and the second initial value is loaded and adapted to be subject to a shift operation in synchronism with the clock;

a fourth code generating exclusive OR means for forming an exclusive OR of outputs from a predetermined fourth set of plural shift stages in the third shift register, delivering it as a fourth code series and feeding it back to the input of the third shift register;

a plurality of fifth code generating exclusive OR means each forming an exclusive OR of outputs from each of a plurality of fifth sets of shift stages in the third shift register which are distinct from the fourth set and which are distinct from each other, and for delivering the exclusive OR's as a plurality of fifth code series;

and a plurality of output exclusive OR means each forming an exclusive OR of a predetermined combination of a plurality of code series including at least three code series from the first, the second, the third, the fourth and the fifth series and delivering it as one of a plurality spread codes which are substantially orthogonal to each other.

4. A CDMA radio receiver according to claim 1 in which the first and the second set in the plural code series generator has an equal number of shift stages and equal relative position between shift stages in each set, the positions of the plurality of the second sets in the first shift register being offset from the positions of the first set by a differing number of stages equal to or more than one stage, further comprising a second shift register including a plurality of shift stages in which a second initial value which is distinct from the first initial value is loaded and is adapted to be subject to a shift operation in synchronism with the clock;

a third code generating exclusive OR means for forming an exclusive OR of outputs from a predetermined third set of plural shift stages in the second shift register, for delivering it as a third code series and for feeding the third code series back to the input of the second shift register;

a plurality of fourth code generating exclusive OR means for forming an exclusive OR of outputs from each of a plurality of fourth sets of shift stages in the second shift register which are distinct from the third set and which are distinct from each other and for delivering the logical OR's as a plurality of fourth code series;

the third set and each of the fourth set having an equal number of shift stages and having equal relative position between the plural shift stages within the set, the positions of the plurality of fourth sets in the second shift register being offset from the positions of the third set by a differing number of stages in the same direction as the plurality of second sets;

and a plurality of output exclusive OR means for forming exclusive OR's of the first and the second code series and the third and the fourth code series and for delivering them as a plurality of spread codes which are offset in phase by a given number of chips.

5. A CDMA radio receiver according to claim 1 in which the plural code series generator further comprises a second shift register including a plurality of shift stages in which a second initial value which is distinct from the first initial value is loaded and adapted to be subject to a shift operation in synchronism with the clock;

a third code generating exclusive OR means for forming an exclusive OR of outputs from a predetermined third set of plural shift stages in the second shift register, for delivering it as a third code series and for feeding the third code series back to the input of the second shift register;

a first output exclusive OR means for forming and delivering an exclusive OR of at least one of the first code series and the plurality of second code series on one hand and the third code series on the other hand;

and a delay shift register including a plurality of shift stages and connected to the output of the first output exclusive OR means;

a plurality of code series which are given delays corresponding to a predetermined number of chips relative to each other which are determined by an input to the relay shift register and positions of the predetermined plural shift stages being delivered as spread codes.

6. A CDMA radio receiver according to claim 5 in which the plural code series generator further comprises a second output exclusive OR means for forming and delivering an exclusive OR of at least another of the first code series and the plurality of the second code series on one hand and the third code series on the other hand;

and a second delay shift register including a plurality of shift stages and connected to the output of the second output exclusive OR means;

a plurality of code series which are given delays corresponding to predetermined numbers of chips relative to each other which are determined by an input to the second delay shift register and the positions of the predetermined plural shift stages being delivered as, spread codes.

7. A CDMA radio receiver according to claim 4 in which the plural code series generator further comprises a third shift register including a plurality of shift stages in which a third initial value which is distinct from the second initial value is loaded and adapted to be subject to a shift operation in synchronism with the clock;

a fifth code generating exclusive OR means for forming an exclusive OR of outputs from a predetermined fifth set of plural shift stages in the third shift register, for delivering it as a fifth code series and for feeding fifth code series back to the input of the third shift register;

and a third output exclusive OR means for forming an exclusive OR of one of the third and the fourth code series and the fifth code series and delivering it as a third spread code which is orthogonal to the first and the second spread code.

8. A CDMA radio receiver according to claim 1 in which the second code generating exclusive OR in the plural code series generator comprises a plurality of shift stage selection means each receiving tap outputs from all the shift stages in the shift register and selecting and delivering an output or outputs from a desired shift stage or stages in accordance with a shift stage selection signal;

a plurality of exclusive OR circuits each forming an exclusive OR of outputs from the shift stages selected in accordance with one of the plurality of shift stage selection means;

and calculation control means for determining a set of shift stages which provide a delay corresponding to a given number of chips by calculation and producing a shift stage selection signal which specifies a set of shift stages and applying it to the plurality of shift stage selection means.

9. A CDMA radio receiver according to claim 8 in which each of the shift stages selection signals has a number of bits which are equal in number to the number of total shift stages in the shift register, each of the shift stage selection means including a multiplier circuit for effecting a multiplication of outputs from all the shift stages and corresponding bits in the shift stage selection signal and delivering a result of multiplication, the first exclusive OR means forming an exclusive OR of results of all the multiplications and delivering it as the M-series.

10. A CDMA radio receiver according to claim 1 in which the first code generating exclusive OR means in the plural code series generator comprises a plurality of shift stage selection means each receiving the tap outputs from all the shift stages of the shift register and selecting and delivering an output or outputs from a desired shift stage or stages in accordance with a shift stage selection signal;

a plurality of exclusive OR circuits each forming an exclusive OR of the shift stages selected by each of the plurality of shift stage selection means;

and calculation control means for determining a set of shift stages which provides a delay corresponding to the given number of chips by calculation and for producing a shift stage selection signal which specifies a set of shift stages and for applying the shift stage selection signal to respective one of the plurality of shift stage selection means.

11. A CDMA radio receiver according to claim 10 in which the shift stage selection signal has a number of bits which is equal in number to the number of total stages in the shift register, the shift stage selection means including a multiplier circuit for effecting a multiplication of outputs from the total shift stages and the corresponding bits of the shift stage selection signal to deliver a result of multiplication, the first exclusive OR means producing an exclusive OR of results of all multiplications of the multiplier circuits and delivering it as the M-series.

12. A CDMA radio receiver according to claim 1 in which the first code generating exclusive OR means comprises a shift stage selection means receiving tap outputs from all the shift stages in the shift register and selecting and delivering an output or outputs from a desired shift stage or stages in accordance with a shift stage selection signal;

an exclusive OR circuit for forming an exclusive OR of outputs from the shift stages selected by the shift stage selection means;

and a calculation control means for producing a shift stage selection signal which specifies a set of shift stages which are used to generate the desired code series and applying the shift stage selection signal to the shift stage selection means.

13. A CDMA radio receiver according to claim 12 in which the first code generating exclusive OR means comprises a shift stage selection means receiving tap outputs from all the shift stages in the shift register and selecting and delivering an output or outputs from a desired shift stage or stages in accordance with a shift stage selection signal;

an exclusive OR circuit for forming an exclusive OR of outputs from the shift stages selected by the shift stage selection means;

and a calculation control means for producing a shift stage selection signal which specifies a set of shift stages which are used to generate the desired code series and applying the shift stage selection signal to the shift stage selection means.

14. A CDMA radio receiver according to claim 12 in which each of the shift stage selection signals comprises a number of bits which are equal in number to the number of all the shift stages in the shift register, the first exclusive OR circuit forming an exclusive OR of the results of all multiplications to deliver the M-series.

15. A CDMA radio receiver according to claim 1 in which denoting the given number of chips by n, the positions of the plural shift stages in the second set are predetermined in accordance with a vector indicated below $$T_{an} = TA_a^n$$

where T represents a tap vector indicating the positions of the plural shift stages in the first set and $A_a$ represents a matrix indicating components of register value which prevails when the first shift register is subject to one shift operation.

16. A CDMA radio receiver according to claim 1, further comprising memory means for storing a correspondence between a code generating initial value which is loaded in the second register of the plural code series generator and a plurality of mutually different spread codes;

and means operative upon a cell search to modify the code generating initial value loaded in the shift register of the code series generator using a stored content in the memory means.

17. A CDMA radio receiver according to claim 1 or 16 in which the plural code series generator generate same spread codes which are phase offset from each other to feed the plurality of reception fingers.

18. A CDMA radio receiver according to claim 1 or 16 in which the spread code generating means include at least two code series generating means, each of which comprises a shift register and an exclusive OR calculation means;

at least one of the code series generating means having a fixed code generating initial value while at least one other code series generating means has a variable code generating initial value.

19. A CDMA radio receiver according to claim 1 or 16 in which during the cell search, the code generating initial value is modified to generate a plurality of different spread codes simultaneously, while during a speech communication, for the at least two code generating means, the connection between the shift register and the exclusive OR calculation means is provided at a plurality of occurrences where the shift stages are offset by an equal number of stages while maintaining the same connection so that outputs from the exclusive OR calculation means having the same offset are exclusively ORed to be capable of delivering spread codes of an identical code configuration, but which are offset in phase from each other.

20. A CDMA radio receiver according to claim 18 in which there are provide at least three code series generating means, at least two code generating means of which have fixed code generating initial values to generate a plurality of spread codes of identical spread code configuration, but which are of mutually differing phases to be supplied to the plurality of reception fingers, at least one of code series generating means having its code generating initial value modified, there being additionally provided a calculator which forms an exclusive OR of an output code from said at least one code generating means and at least one code series from the code series generating means having the fixed code generating initial values.

* * * * *